(12) United States Patent
Tikkanen et al.

(10) Patent No.: US 10,076,016 B2
(45) Date of Patent: Sep. 11, 2018

(54) NETWORK CONNECTED LOW VOLTAGE LIGHTING SYSTEM

(71) Applicant: LUMASTREAM CANADA ULC, Calgary (CA)

(72) Inventors: David Tikkanen, Waterloo (CA); Jason Neudorf, Kitchener (CA); Chris Booth, St. Petersburg, FL (US)

(73) Assignee: LumaStream Canada ULC, Calgary, Alberta (CA)

( * ) Notice: Subject to any disclaimer, the term of this patent is extended or adjusted under 35 U.S.C. 154(b) by 0 days.

(21) Appl. No.: 15/593,499

(22) Filed: May 12, 2017

(65) Prior Publication Data

US 2017/0332462 A1 Nov. 16, 2017

Related U.S. Application Data

(60) Provisional application No. 62/336,095, filed on May 13, 2016.

(51) Int. Cl.
*H05B 37/02* (2006.01)
*H05B 33/08* (2006.01)
*H04L 29/08* (2006.01)

(52) U.S. Cl.
CPC ......... *H05B 37/0272* (2013.01); *H04L 67/02* (2013.01); *H05B 33/0854* (2013.01); *H05B 33/0887* (2013.01)

(58) Field of Classification Search
None
See application file for complete search history.

(56) References Cited

U.S. PATENT DOCUMENTS

| 2012/0280637 | A1* | 11/2012 | Tikkanen | ........... | H05B 33/0803 315/294 |
|---|---|---|---|---|---|
| 2015/0115839 | A1 | 4/2015 | Tikkanen et al. | | |
| 2015/0163867 | A1 | 6/2015 | Recker et al. | | |

FOREIGN PATENT DOCUMENTS

| CN | 102201958 A1 | 9/2011 |
|---|---|---|
| WO | 2015199584 A1 | 12/2015 |

OTHER PUBLICATIONS

International Search Report from International Application PCT/CA2017/050571, dated Aug. 29, 2017.
Written Opinion of the International Searching Authority from International Application PCT/CA2017/050571, dated Aug. 29, 2017.

* cited by examiner

*Primary Examiner* — Jany Richardson
(74) *Attorney, Agent, or Firm* — Gowling WLG (Canada) LLP; Jeffrey W. Wong

(57) ABSTRACT

The present disclosure is directed at a method and apparatus for providing a network connected low voltage lighting system. In one embodiment, the disclosure may be seen as an Internet of Things (IoT) network connected low voltage lighting system.

18 Claims, 5 Drawing Sheets

NETWORK CONNECTED LOW VOLTAGE LIGHTING SYSTEM

CROSS-REFERENCE TO OTHER APPLICATIONS

This application claims the benefit of U.S. Provisional Patent Application No. 62/336,095, filed May 13, 2016, which is hereby incorporated by reference.

FIELD OF THE DISCLOSURE

The disclosure is generally directed at a lighting system and, more specifically, at a network connected low voltage lighting system.

BACKGROUND OF DISCLOSURE

The advancement of various technologies and applications such as Solid State Lighting (SSL) devices and the Internet of Things (IoT) has enabled the integration of these technologies to provide lighting system solutions with enhanced economic benefits.

The rapid adoption of SSL devices such as high power light emitting diodes (LEDs) for white light or general illumination applications is driven by continued improvement in SSL efficacies whereby for example, a traditional 60 watt incandescent light bulb can now be replaced with a 10 watt LED equivalent bulb. This has significantly reduced energy costs by reducing the power requirements for general illumination applications and enabling low voltage distribution of power as a practical approach.

Also, with the advent of the IoT, the lighting of objects or spaces may be commissioned, monitored, and controlled remotely across an existing Internet infrastructure.

Therefore, based on the advancement and integration of these technologies, there is disclosed a novel network connected, intelligent low voltage lighting system for general illumination applications.

SUMMARY OF THE DISCLOSURE

In one aspect of the present disclosure, as part of a low voltage lighting system, there is provided a centralized peripheral interface and power distribution (PIPD) module or apparatus located in a specific zone of activity within a physical location. The PIPD module includes a communication node such as a radio node to transmit and receive data. Within the zone of activity, various peripheral devices such as dimmers and/or sensors may be coupled to the peripheral interface and power distribution (PIPD) module and identified with an address. The PIPD module can be used to communicate with and/or control each of these peripheral devices.

The localized connectivity of these devices and sensors reduces the number of cable runs otherwise required for these devices to communicate with a lighting network controller as the controller is typically mounted a considerable distance from the peripheral interface and distribution module.

In one aspect of the present disclosure, the PIPD module may include embedded sensors or an integrated sensor for monitoring various parameters such as, but not limited to, ambient conditions, object parameters, and safety related parameters. Multiple peripheral interface and power distribution modules may be installed as part of a low voltage lighting system comprising a wireless mesh communication network.

In another aspect, there is provided a lighting system including a local network control apparatus; a set of light emitting diode (LED) drivers, the set of LED drivers in communication with the network control apparatus; a set of peripheral interface and power distribution (PIPD) apparatus, each of the set of PIPD apparatus associated with one of the set of LED drivers; a set of light fixtures, the light fixtures controlled by one of the set of PIPD apparatus; and a remote network control apparatus in communication with the local network control apparatus; wherein the local network control apparatus controls the set of light fixtures based on communication from the remote network control apparatus.

In another aspect, the local network control apparatus includes a wired communication interface; and a wireless communication interface. In a further aspect, the lighting system may further include an Internet of Things (IoT) gateway, the IoT gateway including apparatus for communicating, via an internet communication protocol, with the remote network control apparatus.

In yet another aspect, each of the set of LED drivers includes an LED driver communication interface for communicating with the local network control apparatus; and a set of addressable power channels for transmitting power to at least one of the set of PIPD apparatus. Each of the set of LED drivers may further include a power limit apparatus connected to a voltage bus.

In another aspect, each of the PIPD apparatus includes a controller; a wireless communication interface; and at least one embedded sensor for obtaining sensor data. In an aspect, each PIPD apparatus stores the sensor data for transmission to an Internet of Things (IoT) gateway. In another aspect, each PIPD prioritizes the sensor data for transmission to an Internet of Things (IoT) gateway. In yet a further aspect, each PIPD apparatus filters the sensor data based on predetermined criteria.

In yet another aspect, each PIPD apparatus further includes a set of peripheral ports for connecting to a set of peripheral devices. The set of peripheral devices including at least one dimmer. In another aspect, each PIPD apparatus assigns an address or identification code to each of the set of peripheral devices. In yet another aspect, each PIPD apparatus transmits a change in light intensity signal to the local network control apparatus.

In a further aspect, each PIPD apparatus further includes a set of sensor ports for connecting to a set of external sensors. In another aspect, each PIPD apparatus assigns an address or identification code to each of the set of sensor devices.

In an aspect, each PIPD apparatus includes a cable management apparatus for connecting the power channels to their associated light fixtures. In another aspect, each cable management apparatus further includes an apparatus for protecting the set of light fixtures. In yet another aspect, the apparatus for protecting includes a reverse polarity wiring detection apparatus. In another aspect, the PIPD apparatus transmits a signal to the local network control when a reverse polarity wiring connection event is experienced.

DESCRIPTION OF THE DRAWINGS

Embodiments of the present disclosure will now be described, by way of example, only, with reference to the attached Figures.

DETAILED DESCRIPTION OF PREFERRED EMBODIMENT

The present disclosure is directed at a method and apparatus for providing a network connected low voltage lighting system. In one embodiment, the disclosure may be seen as an Internet of Things (IoT) network connected low voltage lighting system. A low voltage lighting system is typically defined as a system where output power from one or more light emitting diode (LED) drivers transmitted to light fixture loads meets Class 2 requirements as defined in UL1310 Class 2 Power Units and NEC (National Electrical Code) Article 725 for Class 2 Power Limited Circuits.

In the current disclosure, the IoT network connected lighting system is implemented or installed within a geographical location (or physical premise), such as within a house, office, building, or apartment and the like. The system communicates with an off-premise cloud computing location. Communication between the lighting system and the cloud computing location may include the transmission of information such as but not limited to, standards based lighting protocols as part of the lighting system of the disclosure. The system may also be seen as a combined on and off premise communication and computing network. The communication is preferably enabled or performed using standards based wireless protocols such as, but not limited to, Bluetooth™ Mesh, Zigbee™, Z Wave™, WiFi™ and any variations of such protocols. Standards based lighting protocols may include, but are not limited to, protocols such as Digital Addressable Lighting Interface (DALI), Remote Device Management (RDM), DMX512A, and 0-10Vdc analog control or any variations of such protocols. DALI requirements are defined in standards IEC 62386-101; System General Requirements, IEC 62386-102; General Requirements-Control Gear, and IEC 62386-2017; Particular Requirements for Control Gear-LED Modules. The RDM and DMX512A protocols are defined in standards E1.20; Remote Device Management over DMX512 networks and E.11; Asynchronous Serial Digital Data Transmission Standard for Controlling Lighting Equipment and Accessories, respectively. 0-10Vdc protocols are defined in standards ESTA E1.3-2001; "Lighting Control Systems 0-10Vdc Analog Control Specification" for entertainment applications or IEC60929, Annex E; "AC Supplied Electronic Ballasts for Tubular Lamps" for commercial lighting applications.

Figure 1:
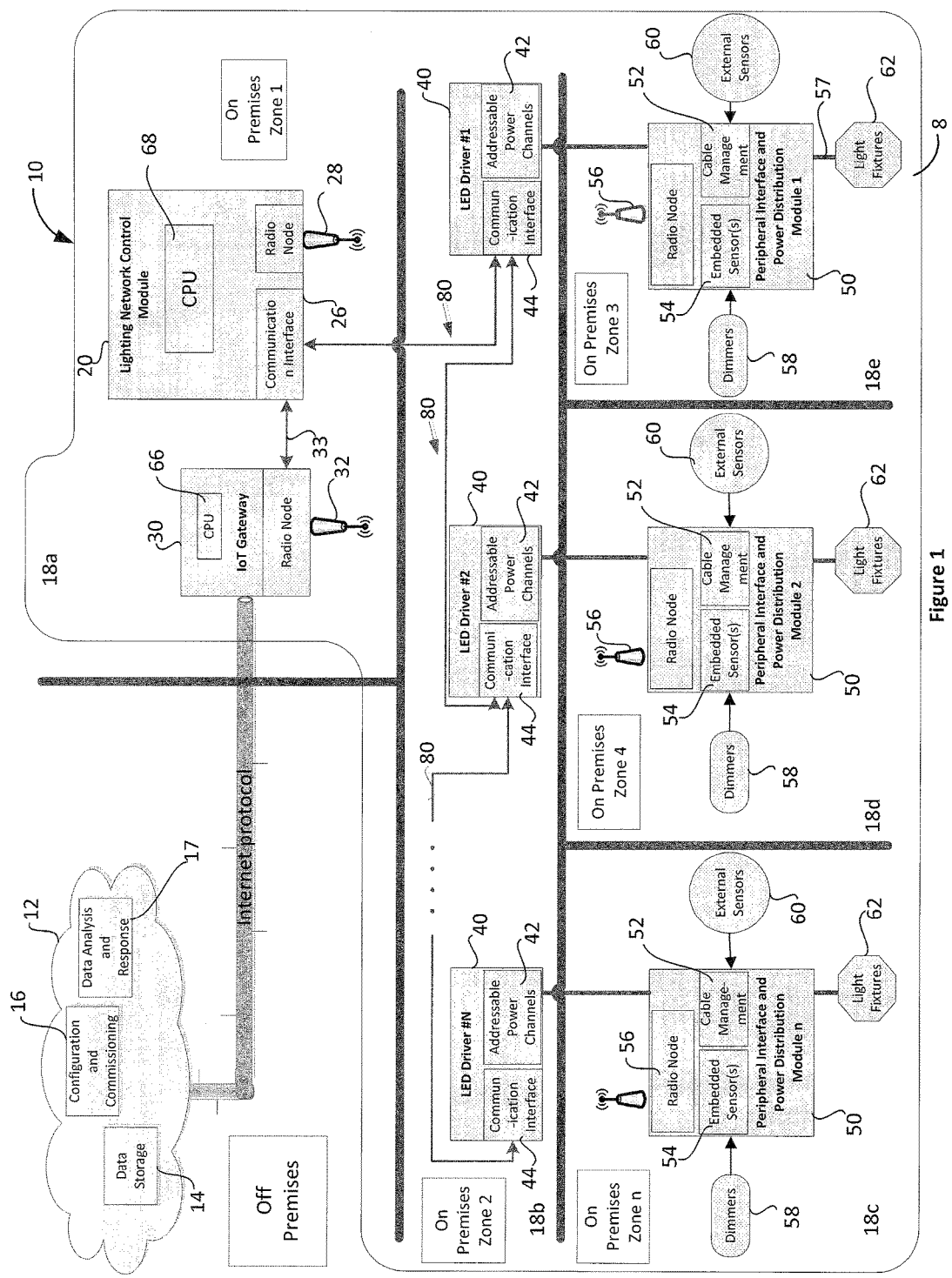
FIG. 1 is a schematic diagram of a network connected low voltage lighting system.

Turning to FIG. 1, a network connected low voltage lighting system is shown. The lighting system 10 is used for lighting control within a physical geographical location, or premises, such as, for example, a house, a building complex or multiple building complexes. The system 10 controls multiple physical zones, or zones of activity, within the premises. For instance, in a house, the different rooms in the house may represent or be seen as individual zones of activity. In an office building, the different offices within the building may be seen as individual zones of activity. In the current embodiment, a set of five zones are shown, each separated from each other by the thick black lines, although it will be understood that the system can control any number of zones within the premises.

The lighting system 10 connects and integrates operational technology such as, but not limited to, sensors and/or peripheral devices for lighting and building facility applications with information technology for information processing. Data is collected by the sensors and the peripheral devices and analyzed by the system in order to provide a response to enhance the lighting within the premises as well as improve facility performance and/or efficiency.

Turning back to FIG. 1, the system 10 is in communication with a cloud computing system 12 that is located remote from the physical geographical location of the system 10. The cloud computing system 12 preferably includes data storage 14, a configuration and commissioning component, or module, 16 and a data analysis and response component, or module 17. These cloud based features, or components, can be used to reduce commissioning, operating, and maintenance costs in order to provide an economic benefit in enterprise applications for multiple-premise locations. In other words, the processing of information retrieved by the system (or multiple systems) can be performed by a single cloud computing system 12.

Communication between the lighting system 10 and the cloud computing system 12 is preferably via known communication protocols such as the Internet Protocol (IP).

In the current embodiment, the low voltage lighting system 10 includes five zones 18 (seen as zones 18a to 18e) within the physical geographical location. Zone one 18a may be seen as a control zone, while zone two 18b can be seen as a driver zone. Zones three 18c, four 18d and five 18e can be seen as lighting zones. Although only three (3) lighting zones are shown, it will be understood that any number of lighting zones can be implemented. While the lighting zones 18c to 18e are distinct, the control zone 18a and the driver zone 18b may be located within one of the lighting zones 18c to 18e and do not have to be physically separate from these zones.

Within zone one 18a, which can be seen as the control zone, the system 10 includes a lighting network control (LNC) module 20 that communicates with the cloud computing system 12 and also communicates with multiple LED drivers located throughout the premises. For instance, the LNC module 20 may communicate with LED drivers located in the driver zone, or zone two 18b. The LNC module 20, or zone one 18a is preferably located in an easily accessible location within the premises, such as, but not limited to, a hallway, an entrance way to a room, floor or building, or a kitchen area in a restaurant.

The LNC module 20 includes a wired communication interface (which may be seen a hard-wired interface) 26 and a wireless communication interface such as via a radio node 28.

The wired communication interface 26 is connected to, or in communication with, an IoT gateway 30, such as over a wired connection 33. In one embodiment, the LNC module 20 communicates, in a bi-directional manner with the IoT gateway 30, information such as LED driver status, LED driver operational information and/or light fixture control information by ways of various protocols standards such as I²C, or SMBus, RS343, RS485, Serial Peripheral Interface (SPI) or Universal Serial Bus (USB). The communication interface 26 preferably includes a communications cabling system 80 to connect, and/or communicate with, different LED drivers 40 preferably implemented in a daisy chain approach with the driver zone 18b.

The IoT gateway 30 includes an IoT gateway radio node 32 that provides wireless communication capabilities to the IoT gateway 30 such as for wireless communication with the PIPD modules 50.

The driver zone, or zone two 18b includes a set of LED drivers 40 that communicate with the LNC module 20. The location of the LED drivers in zone two 18b may include, but are not limited to, an electrical room or closet, a ceiling or wall mount location, an air space above a suspended ceiling or a plenum air handling space.

In a preferred embodiment, the number of LED drivers 40 within the set of LED drivers preferably equals the number of lighting zones, which in the current example is three. It will be understood that other ratios of LED drivers and lighting zones may be implemented with a goal to have enough LED drivers 40 to assist in the operation of the PIPD modules 50 in the lighting zones 18c to 18e. Each of the LED drivers 40 include addressable power channels 42 and a communication interface 44.

With respect to the distribution of power, the LED drivers 40 include the output power channels 42 for transmitting power in accordance with Class 2 power limits as defined in UL1310, to the light fixtures 62 via a peripheral interface and power distribution (PIPD) modules 50. The communication interface 44 within each of the LED drivers 40 receives light fixture control information from the LNC module 20 and then translates this into limited and controlled power that is transmitted to the set of light fixtures 62 via their associated PIPD modules 50. An example of how this may be performed is described in U.S. Pat. Nos. 8,957,601 and 8,525,446 and US Patent Publication No. 2016/0128144 which are hereby incorporated by reference. This controlled power adjusts or controls the light intensity of the light fixtures 62.

Within each of the lighting zones 18c to 18e is an individual peripheral interface and power distribution (PIPD) module 50 associated with the lighting zone 18c to 18e. Each PIPD module 50 preferably includes a cable management apparatus, or module, 52, a set of embedded sensors 54 and a radio node 56. A set of dimmers 58, a set of optional external sensors 60 and a set of light fixtures 62 are in communication with the PIPD module 50. Each of the addressable power channels 42 of an associated LED driver 40 (within the drive zone 18b) is connected to its associated PIPD module 50.

The cable management system 52 electrically connects power channels from the LED drivers to multiple light fixtures 62. Given that limited power is transmitted to the fixtures 62 via these channels 42 as part of the low voltage lighting system, communications type or power limited type cabling such as multi-pair, multi-conductor, single pair, or two conductor cabling can be installed between the LED driver and the PIPD module, or apparatus 50.

The radio nodes 56 may be part of a wireless mesh communication network that transmits/receives data packets between the IoT gateway 30 and various other radio nodes within the system 10. Alternatively, the wireless mesh communication network allows data packets to hop between various PIPD modules 50 before arriving or being communicated to the IoT gateway 30. This optimizes, or improves, the reliability of wireless data transmission to and from the various PIPD modules 50 in different zones and mitigates or reduces the risk of lost data.

The radio nodes 56 distribute data to and from nearby nodes to the the IoT gateway 30 or LNC module 20 as they may be too far away to reach in a single hop thereby enabling a network that can communicate over greater distances. This mesh wireless topology network also increases reliability as each node is connected to multiple other nodes with different possible transmission routes to their peers.

In one method of operation, the LNC module 20 communicates, preferably wirelessly via the radio node 28, with the PIPD modules 50 located in lighting zones three 18c, four 18d and five 18e to receive and/or transmit peripheral device data. This reduces or eliminates the need for cables to connect to the LNC module 20 with each PIPD module 50 individually.

Within the lighting zones 18c to 18e, at least one PIPD module 50 is preferably mounted in various areas or the physical zone such as within a ceiling location. For example with reference to FIG. 1, the lighting zones may be defined as a specific meeting or work area such as an office in a commercial building, a retail space different sale areas, or a specific seating location within a restaurant. Alternatively, the lighting zones may simply be defined as an office space, a hotel room, a retail section or living space in other applications.

Various sets of lighting fixtures 62 and peripheral devices, such as dimmers, 58 are connected to a PIPD module 50 within its zone of activity or lighting zone. The dimmer, or dimmers, 58 can be used to vary the light intensity of the corresponding light fixture 62. Other examples of peripheral devices include, but are not limited to, video monitoring or video recording devices. The PIPD module 50 may also be connected to various external sensors 60 for monitoring various lighting, environmental, object, and building system parameters within the lighting zone. Although only one dimmer 58 and one external sensor 60 are shown, it will be understood that there may be more than one of each component located within a lighting zone 18c to 18e. Also, although shown in a one-to-one relationship, the PIPD module 50 may power more than one light fixture 62 whereby the number of PIPD modules 50 within a zone may be any number which are required to operate the light fixtures 62 in each of the lighting zones 18c to 18e.

In this embodiment, multiple PIPD modules 50 and their locations within a lighting zone 18c to 18e, centralize the connectivity of the peripheral devices 58 and sensors 60. The peripheral devices 58 may be hardwired to the PIPD modules 50 reducing the need for cables that would otherwise need to be connected between the peripheral devices 58 and the LNC module 20. The PIPD modules 50 may also include embedded or integrated sensors 54 instead of, or in addition to, the externally connected sensors 60. The embedded sensors 54 preferably have the same or additional sensory capabilities compared with the connected sensors 60. Apparatus for performing localized processing of the data and data storage capabilities are also implemented in the PPID module 50.

Data collected from either the embedded sensors 54 or the external sensors 60 is preferably transmitted wirelessly, such as via a wireless mesh network to the IoT gateway 30 via the PIPD radio nodes 50. The collected data can also be transmitted via the PIPD radio node 56 to the radio node 28 of the LNC module 20.

In one mode of operation, within each PIPD module 50, the cable management apparatus 52 receives limited power from the LED driver power channels 42 and transfers the limited power to the light fixtures 62 to power the light fixtures. In one embodiment, power is limited by an apparatus such as an electronic circuit that includes a current sense connected to the secondary side output voltage bus of a galvanically isolated LED Driver. In one embodiment, the power limit apparatus monitors and limits power to the set of addressable power channels to less than 100 watts. Protection is provided in the event of an output overload or an electrical component fault in an address power channel 42 or light fixture 62.

The cable management apparatus 52 may also include apparatus to monitor and obtain data relating to the output power being provided to the light fixture loads 62 such that this information can be transmitted to the IoT gateway 30 in order to better control the power being delivered to the light fixtures 62. This data may be transmitted from the IoT gateway to the cloud computing system for processing of the information to determine a desired light intensity for the light fixtures.

In another mode of operation and with reference to FIG. 1, various processing functionality is performed by the cloud computing system 12. For example, in building management applications, in terms of responding to the analysis of data in a building management application, information such as, but not limited to, sensor data (such as retrieved from the embedded sensors 54) reflecting the difference between ambient temperatures from a particular lighting zone, motion sensor data and activity within a particular lighting zone, and the time of day or night as well as month of the year may be collected and correlated (by the computing system 12) as part of a trend analysis to spot a pattern or repetitive behaviour. A response can then be determined by the cloud computing system, such as to adjust the heating or cooling, of a particular lighting zone at a particular time of day and/or month to reduce operating costs.

As another example, in terms of responding to the analysis of data in energy saving applications versus occupancy or usage within a particular lighting zone, ambient light sensor data, motion sensor data and activity, and the time of day or night as well as the month of the year can be collected and correlated as part of a trend analysis to spot a pattern or repetitive behaviour. A response can then be made to adjust the light intensity levels from the light fixtures at a particular time of day and/or month to reduce energy costs.

In one embodiment, after this response is determined, the cloud computing 12 system can transmit a configuration requirement representing this response to the LNC module 20 which then transmits signals to the LED driver to power the light fixture (or other components where applicable) accordingly. This may be performed by having the LED driver 40 transmit power to the PIPD module 50 via the power channel 42 which then transmits this power to the light fixture.

These examples are only a few of many possible applications where the user can correlate data obtained from various sensors 54 or 60 within one or numerous lighting zones 18c to 18e to analyze and optimize or improve characteristics of system operations.

In another embodiment, the IoT gateway 30 collects and stores sensor data via the radio node 32 that is transmitted from the individual PIPD modules 50 via radio node 56. The sensor and peripheral data can then be converted to a format for transmission to the cloud computing system 12. The conversion of the sensor and peripheral data may be via a processor or central processing unit (CPU) 66 or 68 located within the IoT gateway 30 or the LNC module 20, respectively.

The IoT gateway 30 may prioritize what sensor data, how much data and over what period of time the data is logged before it is uploaded to the data storage 14 of the cloud computing system 12. The data may also be filtered for specific characteristics, or predetermined criteria, such as maximum or high object temperatures, peak output power levels from the LED drivers versus time of day, transient power events, etc.

In conjunction with the IoT gateway 30, the PIPD module may also filter data for specific criteria such as peak power levels from the power channels 42 and/or ambient light activity in a zone versus time of day. The PIPD module 50 may also prioritize sensor data for immediate or delayed transmission. For example, the PIPD module may immediately transmit the detection of smoke in a particular zone to the storage location 12 via the IoT gateway 30 for an immediate response.

Monitoring data during commissioning of the lighting system and operation of the network of LED drivers may include but is not limited to self-test diagnostics results during power up or in operation; no connection of output light fixture; shorted output power channel; LED driver failure; LED driver hours of operation; LED driver Internal operating temperatures; power factor correction (PFC) parameters; power channel output power levels; power channel output current levels; power channel output voltage levels; input AC mains voltage transient events and voltage dips and interruptions; LED driver output bus voltage transient events; intensity adjustment of on board visual display; reverse polarity connection of output power channels to fixtures; and/or improper interconnection between output power channels The possible parameters monitored from the sensors 54 and 60 and collected by the PIPD modules 50 and transmitted via the radio nodes 56 to the IoT gateway 30 include but are not limited to object operating temperatures, occupancy or motion sensing, ambient room temperature, available daylight within a zone, output light intensity from light fixtures as well as general ambient light within a zone.

Similarly, such sensors may also monitor building management infrastructure parameters such as security, safety, air quality, electrical infrastructure, and telecommunications. Examples include parameters such as intrusion detection, smoke, carbon monoxide, and wireless network connection status.

With respect to data analysis, sensor data is transmitted to the cloud computing system 12 via the IoT gateway 30 and/or LNC module 20 for a response. The low voltage lighting system response from various sensor data inputs communicated from the PIPD module 50 can be prioritized in terms of an immediate transmission or a delayed transmission. For example, sensor data such as occupancy or motion sensing may be transmitted to the LNC module for an immediate response to adjust the light intensity level in a particular zone. This sensor data is also transmitted to the IoT gateway 30 and cloud computing system 12 for trend analysis.

Another example of sensor data may include security or safety sensors detecting unsafe levels of smoke or carbon monoxide. An immediate response would be to notify off premise emergency services via the IoT gateway 30 and/or cloud computer system 12 as well an on premise response via the LNC module 20 to flash the lights to notify of an emergency and increase light intensity levels of all zones in a building to full intensity to expedite the evacuation of a building or premise.

With respect to peripheral devices 58 such as a dimmer, a desired change in light intensity via an adjustment to the dimmers 58 may be communicated through a hardware cable connection to the PIPD module 50. The light fixture control information is then communicated from the various PIPD modules 50 through a wireless mesh network via radio nodes 56 to the LNC module 20 via radio node 28. The LNC module 20 may then communicate the light fixture control information through a hardware cable connection to LED drivers 40 for an immediate response.

An example of a delayed response may include the logging of ambient light sensor data over a period of time with a time stamp of time of day and date. This data may be stored in the PIPD module 50 for a period of time and then at an opportune time such as when the wireless mesh network has available transmission bandwidth, it is transmitted to the PIPD module.

The PIPD module 50 also allocates a unique address to each sensor and peripheral device for ease of control of these peripheral and sensor devices. This set of addresses is typically associated with a particular zone or lighting area.

The light fixtures 62 may include any light source for general white light illumination applications. A preferred embodiment includes light fixtures comprising LED (light emitting diode) loads or OLED (organic light emitting diode loads).

Figure 2:
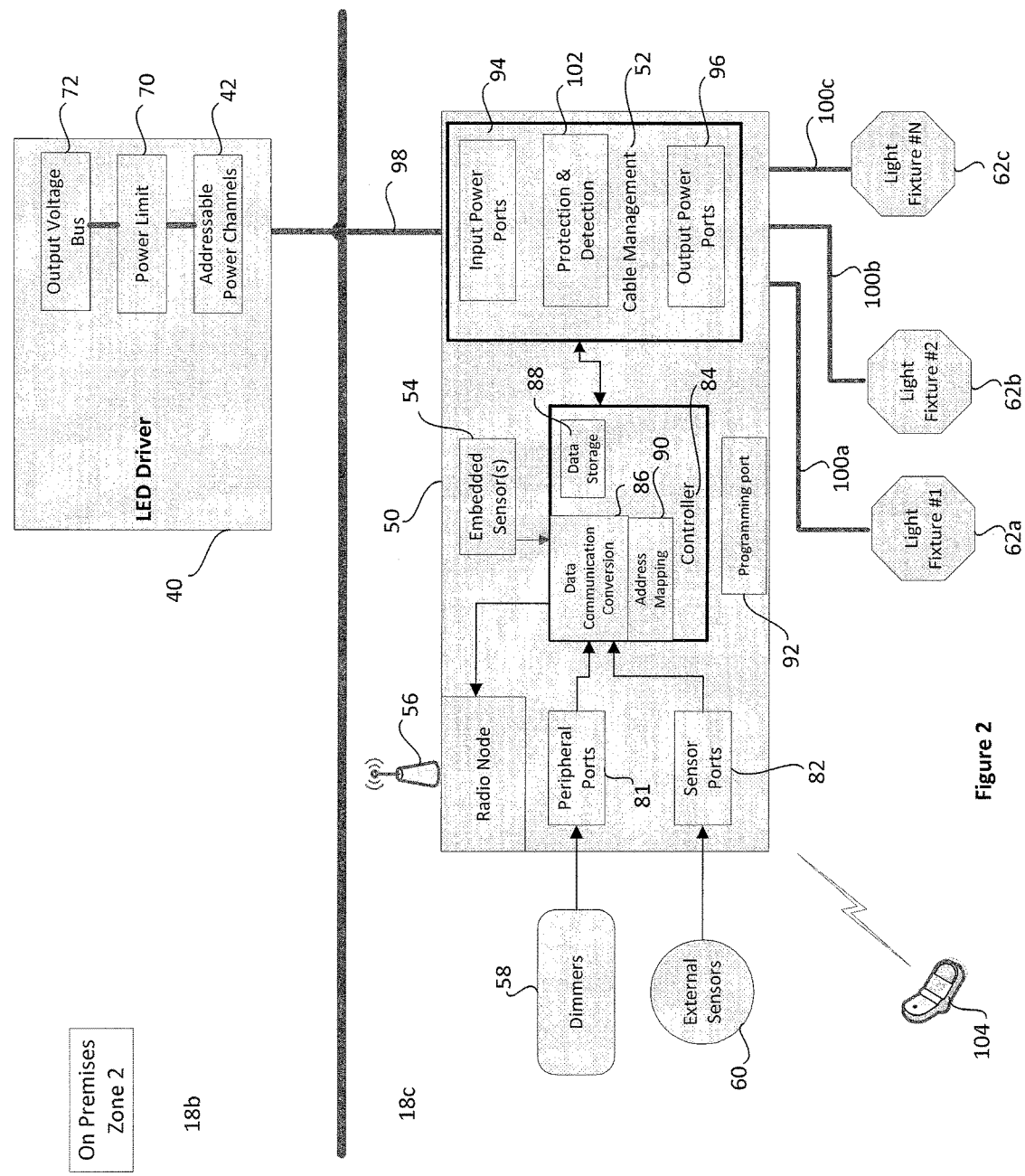
FIG. 2 is a schematic diagram of a light emitting diode (LED) driver interfaced with a peripheral interface and power distribution (PIPD) module.

FIG. 2 shows a detailed embodiment of a single LED driver 40 interfaced with a PIPD module 50 within one of the lighting zones. In the current embodiment, the PIPD module 50 within lighting zone three 18c is shown. The PIPD module 50 of FIG. 2 provides more details than the one shown in FIG. 1.

As shown in FIG. 2, the LED driver 40 includes a power limit apparatus 70 for limiting power from a regulated voltage bus 72. This limited power can then be transmitted to at least one of the light fixtures 62 (seen as 62a to 62c) via the addressable power channel 42 to the associated PIPD module 50. The voltage bus 72 may be typically configured for various nominal dc voltage levels such as 24 Vdc, 42 Vdc, or configured to a set point anywhere in a range of 42.4 Vdc to 57 Vdc.

The PIPD module 50 includes peripheral ports 81 and sensor ports 82 for electrical connection of peripheral devices, such as the dimmer 58 and sensor devices such as external sensor 60, respectively. The ports can be a data and communications type connector such as USB or RJ45 whereby the connectors may be of a terminal block type configuration.

The peripheral ports 81 are preferably coupled to a controller 84 including a data communication conversion apparatus 86. The controller 84 typically includes at least one microcontroller with associated ancillary circuits and associated firmware to convert the various peripheral and sensor device data communication methods to any one of many known various wireless communication transmission methods. For example, the peripheral and sensor communication standards based protocols can include, but are not limited to, $I^2C$ or SMBus, RS232, RS485, USB (Universal serial Bus) DALI, or 0-10 Vdc analog.

The controller 84 includes a data storage 88 to temporarily, or permanently, store low priority historical sensor data such as ambient light, motion or activity data that does not require an immediate response. An example can include room ambient temperature data collected over a period of time by the embedded sensor 54. The controller 84 also includes an apparatus to assign an address or identification code 90 to each peripheral and sensor device as well as a programming port 92 for configuring the PIPD module 50 by means of firmware. The programming port 92 is preferably accessible outside the PIPD enclosure 50 for on premise configurability.

The PIPD module 50, via radio node 56, communicates directly with the LNC module (not shown) or hops between alternate radio nodes located within other PIPD modules in other lighting zones. Various wireless standards based protocols can include Bluetooth wireless mesh, Wifi, Zigbee and Z wave.

The peripheral devices, such as dimmer 58 may also include momentary contact closure type switches to trigger a gradual fade or change in light intensity. This trigger is wirelessly communicated via the radio node 56 to the LNC module 20. The LNC module 20 preferably includes a program to then execute the fade sequence.

The cable management apparatus 52 includes input power ports 94 and output power ports 96 to couple the LED driver power channel 42 to the light fixture 62 loads. Although only a single light fixture 62 was shown in FIG. 1, it can be seen in FIG. 2 that the PIPD module 50 can be configured to control or operate multiple light fixtures 62. The cable management apparatus 52 splits the output from the power channels 42 connected by a multi-conductor or multi-pair cable 98 into individual power channels that are connected to their associated light fixture loads 62a to 62c via cables 100.

The output cable connections between the PIPD module 50 and the light fixture loads are preferably two conductor or a single pair communications type or power limited type cabling. The input power ports 94 and the output power ports 96 typically include two part power type connectors and may include apparatus for strain relief for the wiring connections. For example, during commissioning of the low voltage lighting system, if the input or output ports 94 or 96 are mis-wired, a protection and detection apparatus 102 can detect a reverse polarity wiring event and consequently, limit either power, voltage, or current to one or more light fixtures and prevent or reduce damage to the fixtures 62. The protection and detection apparatus 102 also communicates an error signal identifying which power channels 42 are affected to the controller 84. This error signal can then be transmitted via radio node 56 to the LNC module 20 or IoT gateway 30, or an alternative commissioning apparatus such as a graphical user interface (not shown).

Within a particular lighting zone, an application can be downloaded to a handheld personal communication device, such as a cell phone, a Smartphone, a tablet and the like, 104 from the Internet. The handheld device is preferably able to communicate wirelessly to the PIPD module 50 in a zone and identify what zone the handheld device 104 is in. The handheld 104 may include applications or programs that provides a trend analysis summary based on collected and correlated historical data within a particular zone. To optimize or improve the lighting environment, an end user with the handheld 104 can respond based on a review of the trend analysis by modifying or prioritizing the environmental or lighting parameters for a future period of time within the zone.

In operation, after receiving instructions to power a light fixture from the LNC module 20, power is first limited from the voltage bus 72 based on the instructions and then transmitted to the power channel 42. In a preferred embodiment, power is controlled to vary light intensity by various pulsing or continuous current reduction methods or a combination of both. The power channels 42 may be either constant current or constant voltage outputs.

Constant current outputs typically include a current source with preferably ancillary circuitry for operation and include a buck topology with hysteretic control. The set point current of the current sources outputs is configured for the appropriate rating of numerous types of LEDs specified by the manufacturer such as anywhere in the range of 175 mA to 2100 mA. Constant voltage outputs operate at approximately the same voltage as the voltage bus. Ancillary circuitry may be included to implement a pulsing method with a constant peak voltage in order to control the amount of power to the light fixture loads.

Figure 3:
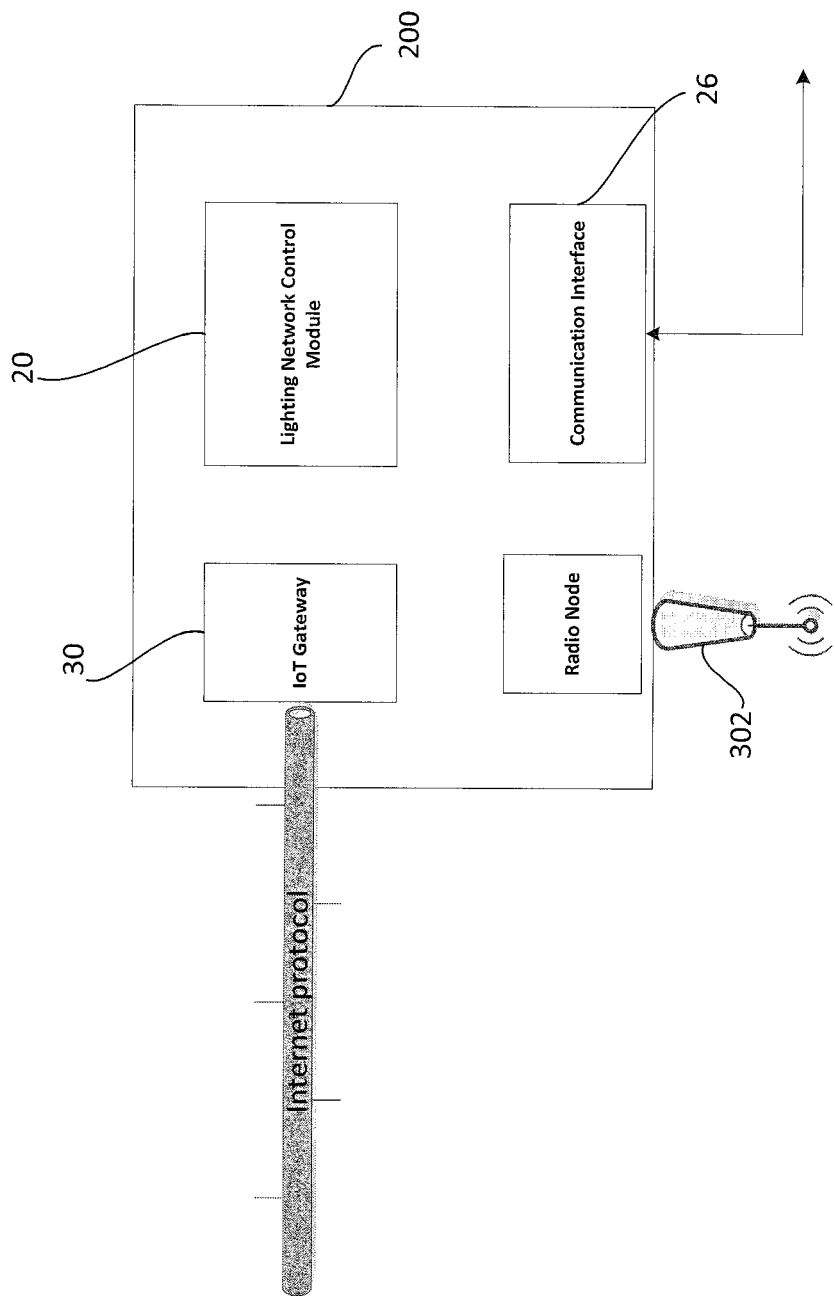
FIG. 3 is a schematic diagram of an Internet of Things (IoT) gateway and lighting network control (LNC) module.

FIG. 3 is a schematic diagram of another embodiment of the IoT gateway and lighting network control (LNC) module. In this embodiment, the IoT gateway 30 and the LNC 20 module are integrated into a single self-contained apparatus 200. A common radio node 302 is used for both receiving sensor data from the various PIPD modules 50 as well as receiving and transmitting peripheral device data such as dimmer data to the various PIPD modules 50 within the low voltage lighting system network 10. All other functional aspects of the network connected low voltage lighting system 10 remain the same as previously described above.

Figure 4:
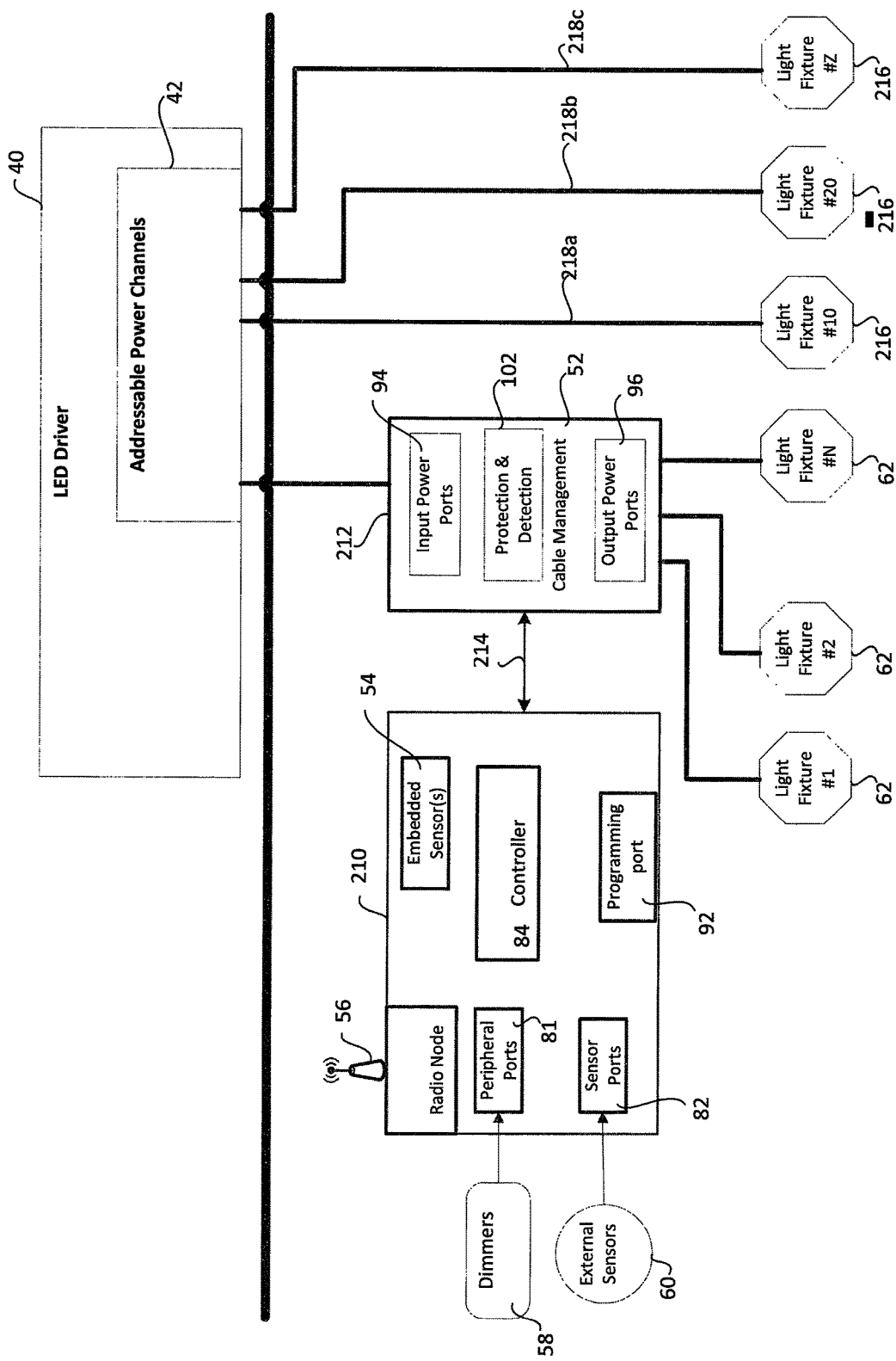
FIG. 4 is a schematic diagram of a PIPD module.

FIG. 4 is a schematic diagram of another embodiment of the PIPD module separated into two distinct components. FIG. 4 also shows an alternate distribution of limited power from the addressable power channels 42 to the light fixture loads.

In the current embodiment, the peripheral interface and the sensor interface functions are implemented in a self-contained apparatus 210. The sensor functions in apparatus 210 are intended for external environmental applications. The power distribution protection and detection functions are implemented in another self-contained apparatus 212. The protection and detection function includes ancillary circuitry to detect a fault condition such as reverse polarity and sends the data to apparatus 210. The radio node 56 then sends this event data to the LNC module 20 which provides a control signal to the LED driver 40 to disable power to the address power channel 42. The protection and detection data is transmitted via a communications cable 214 between the two distinct apparatus.

If the power distribution apparatus 212 is not implemented between the channels 42 of the LED driver 40 and light fixtures 216, power is transmitted directly via cables (218a, 218b, 218c) to the light fixture loads 216. In this embodiment, the peripheral interface and sensor interface apparatus 210 is deployed to communicate the sensor and peripheral device data to the IoT gateway 30 and/or LNC module 20. All other functional aspects of the network connected low voltage lighting system remain the same as previously described.

Figure 5:
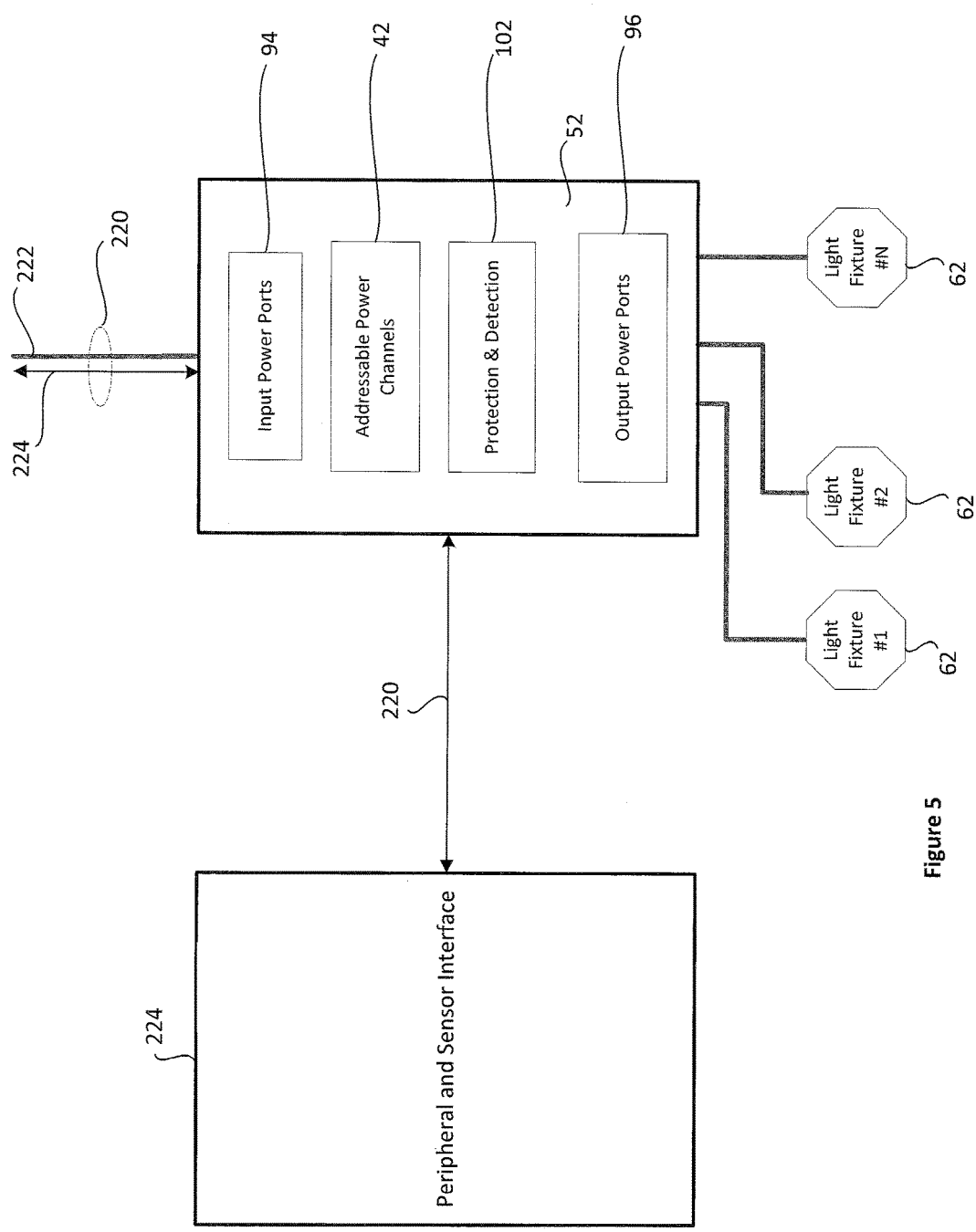
FIG. 5 is a schematic diagram of a power distribution apparatus.

With reference to FIG. 5, a further embodiment of a power distribution apparatus is shown. In this embodiment, the addressable power channels 42 are integrated within a cable management system 52. A communications cable 220 connects both limited power 222 and a data signal 224 to the power distribution apparatus cable management system 52. As discussed above, the input power may include a constant DC voltage such as 24 Vdc, 42 Vdc, or a nominal voltage set point anywhere in the range of 42.4 Vdc to 57 Vdc. The power channels may include either a constant current output or a constant voltage output for powering the light fixture loads.

The data signal 224 includes light fixture control information to adjust the average output power supplied to the light fixture loads 62. As an example, the addressable power channels 42 may include an associated current source comprising a buck switch mode topology with hysteretic control which converts the constant input voltage to constant current outputs. Protection and detection status as well as addressable power channel 42 monitoring data is transmitted via a communications cable 220 to the peripheral and sensor interface apparatus 224.

While several embodiments have been provided in the present disclosure, it should be understood that the disclosed systems and methods might be embodied in many other specific forms within departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed is:

1. A lighting system comprising:
   a local network control apparatus including a wired communication interface and a wireless communication interface;
   a set of light emitting diode (LED) drivers, the set of LED drivers in communication with the local network control apparatus;
   a set of peripheral interface and power distribution (PIPD) apparatus, each of the set of PIPD apparatus associated with one of the set of LED drivers;
   a set of light fixtures, the light fixtures controlled by one of the set of PIPD apparatus;
   a remote network control apparatus in communication with the local network control apparatus; and
   an Internet of Things (IoT) gateway, the IoT gateway including apparatus for communicating, via an internet communication protocol, with the remote network control apparatus;
   wherein the local network control apparatus controls the set of light fixtures based on communication from the remote network control apparatus.

2. The lighting system of claim 1 where each of the set of LED drivers comprises:
   an LED driver communication interface for communicating with the local network control apparatus; and
   a set of addressable power channels for transmitting power to at least one of the set of PIPD apparatus.

3. The lighting system of claim 2 wherein each of the set of LED drivers further comprises:
   a power limit apparatus connected to a voltage bus.

4. The lighting system of claim 1 wherein each of the PIPD apparatus comprises:
   a controller;
   a wireless communication interface; and
   at least one embedded sensor for obtaining sensor data.

5. The lighting system of claim 4 further comprising:
   a programming port.

6. The lighting system of claim 4 wherein each PIPD apparatus stores the sensor data for transmission to an Internet of Things (IoT) gateway.

7. The lighting system of claim 4 wherein each PIPD prioritizes the sensor data for transmission to an Internet of Things (IoT) gateway.

8. The lighting system of claim 4 wherein each PIPD apparatus filters the sensor data based on predetermined criteria.

9. The lighting system of claim 4 wherein each PIPD apparatus further comprises:
   a set of peripheral ports for connecting to a set of peripheral devices.

10. The lighting system of claim 9 wherein the set of peripheral devices comprises at least one dimmer.

11. The lighting system of claim 9 wherein each PIPD apparatus assigns an address or identification code to each of the set of peripheral devices.

12. The lighting system of claim 10 wherein each PIPD apparatus transmits a change in light intensity signal to the local network control apparatus.

13. The lighting system of claim 4 wherein each PIPD apparatus further comprises:
   a set of sensor ports for connecting to a set of external sensors.

14. The lighting system of claim 13 wherein each PIPD apparatus assigns an address or identification code to each of the set of sensor devices.

15. The lighting system of claim 1 wherein each PIPD apparatus comprises:
   a cable management apparatus for connecting the power channels to their associated light fixtures.

16. The lighting system of claim 15 wherein each cable management apparatus further comprises an apparatus for protecting the set of light fixtures.

17. The lighting system of claim 16 wherein the apparatus for protecting comprises a reverse polarity wiring detection apparatus.

18. The lighting system of claim 17 wherein the PIPD apparatus transmits a signal to the local network control when a reverse polarity wiring connection event is experienced.

* * * * *